(12) United States Patent
Hashimoto et al.

(10) Patent No.: US 7,488,122 B2
(45) Date of Patent: Feb. 10, 2009

(54) OPTICAL CONNECTOR AND OPTICAL MODULE

(75) Inventors: Youichi Hashimoto, Minato-ku (JP); Junichi Sasaki, Minato-ku (JP); Ichiro Hatakeyama, Minato-ku (JP); Kazuhiko Kurata, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/694,787

(22) Filed: Mar. 30, 2007

(65) Prior Publication Data

US 2007/0292081 A1      Dec. 20, 2007

(30) Foreign Application Priority Data

Mar. 31, 2006    (JP)  .............................. 2006-098483

(51) Int. Cl.
*G02B 6/36* (2006.01)
(52) U.S. Cl. .................. 385/92; 385/52; 385/53; 385/49
(58) Field of Classification Search .................. 385/49, 385/52, 53, 92, 129, 130
See application file for complete search history.

(56) References Cited

U.S. PATENT DOCUMENTS

| | | | |
|---|---|---|---|
| 2001/0019648 A1* | 9/2001 | Nobuhara | 385/84 |
| 2001/0024549 A1* | 9/2001 | Takahashi et al. | 385/92 |
| 2001/0028768 A1* | 10/2001 | Terashima | 385/88 |
| 2002/0015562 A1* | 2/2002 | Kikuchi et al. | 385/88 |
| 2002/0028048 A1* | 3/2002 | Dair et al. | 385/89 |
| 2002/0048436 A1* | 4/2002 | Nishikawa et al. | 385/88 |
| 2003/0007754 A1* | 1/2003 | Terashima | 385/88 |
| 2003/0018294 A1* | 1/2003 | Cox | 604/20 |

FOREIGN PATENT DOCUMENTS

| | | |
|---|---|---|
| JP | 2000-114581 A | 4/2000 |
| JP | 2000-332301 A | 11/2000 |
| JP | 2001-185752 A | 7/2001 |
| JP | 2001-188146 A | 7/2001 |
| JP | 2002-174744 A | 6/2002 |
| JP | 2003-207694 A | 7/2003 |

(Continued)

OTHER PUBLICATIONS

Ichiro Hatakeyama, et al. "System LSI Module with Optical I/O Interfaces (1) Module Configuration and Design", NEC Corporation and NEC Engineering, Ltd., C-3-123-C-3-127.

(Continued)

*Primary Examiner*—James P Hughes
(74) *Attorney, Agent, or Firm*—Sughrue Mion, PLLC

(57) ABSTRACT

An optical waveguide or first optical fiber whose one end optically connects with a light exit plane and/or light incidence plane of an optical element and whose other end optically connects with an second optical fiber and a connector for mechanically connecting the optical waveguide or the first optical fiber and the second optical fiber are included. The optical waveguide or first optical fiber is bent in order to change the traveling direction of light so that the light incoming from one end is emitted from the other end substantially in parallel with a board and the light incoming substantially in parallel with the board to the optical waveguide or first optical fiber from the other end is emitted from one end toward the optical element.

12 Claims, 8 Drawing Sheets

FOREIGN PATENT DOCUMENTS

| | | |
|---|---|---|
| JP | 2003-215371 A | 7/2003 |
| JP | 2003-255179 A | 9/2003 |
| JP | 2004-093617 A | 3/2004 |
| JP | 2004-518156 A | 6/2004 |
| JP | 2004-235418 A | 8/2004 |
| JP | 2004-240220 A | 8/2004 |
| JP | 2004-246279 A | 9/2004 |
| JP | 2004-273923 A | 9/2004 |
| JP | 2004-279892 A | 10/2004 |

OTHER PUBLICATIONS

General Assembly Lecture Collected Papers C-3-123-C-3-127 of The Institute of Electronics 2003.

* cited by examiner

OPTICAL CONNECTOR AND OPTICAL MODULE

BACKGROUND OF THE INVENTION

1. Field of the Invention

The present invention relates to an optical connector and an optical module, particularly to a technique for realizing optical coupling between an optical element mounted on a board and an optical fiber at low cost.

2. Description of the Related Art

As the bit rate increases in an information device such as a computer, in-board optical coupling for connecting LSIs such as CPUs or memories by an optical fiber or optical waveguide is considered promising. In in-board optical coupling, an LSI having an optical-signal input/output function is used. Optical signals inputted to or outputted from the LSI are transmitted through an optical fiber or optical waveguide.

When LSIs mounted on a board are optically coupled to each other by an optical fiber or optical waveguide, handling of the extra length of the optical fiber or optical waveguide may be complicated. Therefore, it is preferable that an LSI and optical fiber or optical waveguide be detachable from each other. An optical module to which an optical fiber is removably attached is described in General Assembly Lecture Collected Papers C-3-123-C-3-127 (hereafter referred to as "prior document") of The Institute of Electronics 2003.

FIG. 1 shows a sectional view of an optical module described in the prior document As shown in FIG. 1, vertical cavity surface emitting laser (VCSEL) 182, laser diode driver (LDD) 183 for driving VCSEL 182, and AC-connecting capacitor 186 are mounted on transparent resin board 181. VCSEL 182 and LDD 183 are covered with metallic shielding frame 188. Light (optical signal) emitted from VCSEL 182 enters reflection mirror 190 that is tilted to 45° through condenser lens (lens array) 184. The light entering reflection mirror 190 is reflected by reflection mirror 190 and enters optical fiber 192. Condenser lens 184 is provided in optical I/O connector holder 185. Reflection mirror 190 and optical fiber 192 are provided in optical I/O connector 191. By changing the direction of the light that is emitted from VCSEL 182 to the direction parallel with board 181 by reflection mirror 190, it is possible to lower the height of the space above board 181. LDD 183 is electrically connected with a multilayer board (BGA board 189) through a resin board (interposer 187) having a via-plug. A solder bump is used for making electrical connection between interposer 187 and BGA board 189.

Optical I/O connector 191 having reflection mirror 190 and optical fiber 192 is removably attached to optical connector holder 185. The optical axis between optical I/O connector 191 and optical connector holder 185 is adjusted by means of a not-illustrated guide pin and a through-hole formed on condenser lens 184. In this case, because the effective optical-path length from the exit plane of VCSEL 182 up to the incident plane of optical fiber 192 is large, it is difficult to obtain sufficient coupling efficiency without using a lens. In the optical module described in the prior document, sufficient coupling efficiency is secured by using condenser lens 184. Moreover, in the optical module described in the prior document, condenser lens 184 is provided on transparent resin board 181 on which VCSEL 182 is mounted. Therefore, even if the optical axis of optical fiber 192 is displaced due to insertion or removal of optical I/O connector 191, optical coupling and connection separation are performed by using a large optical beam diameter. As a result, stable optical coupling efficiency can be obtained.

However, because a reflection mirror is indispensable for the optical module described in the prior document, fabrication costs increase. Moreover, fabrication costs increase because angle adjustment of the reflection mirror is necessary. Furthermore, it is necessary to use a lens in order to obtain stable optical coupling efficiency. However, the lens is expensive and lens mounting work is costly.

To reduce the cost of the optical module, it is important to reduce the number of parts and the assembly man-hours.

SUMMARY OF THE INVENTION

It is an object of the present invention to realize highly efficient optical coupling between an optical element and an optical fiber or optical waveguide at a low cost.

A first optical connector of the present invention is an optical connector for removably connecting a board on which an optical element is mounted and a second optical fiber. This optical connector has an optical waveguide or first optical fiber, support and connector.

One end of the above optical waveguide or first optical fiber is optically connected with the light exit plane and/or light incidence plane of an optical element and the other end is optically connected with the second optical fiber. The above support supports the optical waveguide or first optical fiber. The above connector mechanically connects the support and the second optical fiber.

The support supports the optical waveguide or first optical fiber so that the traveling direction of the light entering the optical waveguide or first optical fiber is changed to a predetermined direction. Specifically, the traveling direction of the light incoming from one end of the optical waveguide or first optical fiber is changed so the light is emitted in a direction substantially parallel with board surface from the other end of the optical waveguide or first optical fiber. Moreover, the traveling direction of the incoming light substantially parallel with the board surface from the other end of the optical waveguide or first optical fiber is changed so that the light is emitted to an optical element from one end of the optical waveguide or first optical fiber.

A first optical module of the present invention has a board on which an optical element is mounted and has the first optical connector of the present invention.

In the above first optical connector, the optical element is optically connected with the second optical fiber by the optical waveguide or first optical fiber. Therefore, optical components such as a lens and reflection mirror are unnecessary. Moreover, light enters and exits substantially parallel to the board on which an optical element is mounted so as to optically connect the element to the second optical fiber. Therefore, the board does not have bulk. Furthermore, because a connector for connecting a support with the second optical fiber is used, it is possible to easily perform optical rewiring with an optical fiber.

A coaxial via-plug which passes through a support may be formed to direct an electrical signal from a board to a circuit board. The coaxial via-plug formed on the support may help reduce the number of electrical wiring substrates such as resin substrates respectively provided with a coaxial via-plug. Moreover, because the coaxial via-plug penetrates the support and is able to connect with an electrical socket provided on the above circuit board, a board on which an optical element is mounted can be separated from a circuit board and a component can be easily replaced upon failure. As a result, it is possible to reduce the cost of a board or apparatus on which an optical module is mounted.

A second optical connector of the present invention is an optical connector for removably connecting a board on which an optical element is mounted with a second optical fiber. The optical connector has an optical waveguide or first optical fiber that is provided in the above described board and connector for mechanically connecting the above mentioned board with the second optical fiber.

One end of the above optical waveguide or first optical fiber optically connects with the light exit plane and/or light incidence plane of the optical element, and the other end of the above optical waveguide or first optical fiber optically connects with the above second optical fiber.

The above board supports the optical waveguide or first optical fiber so that the traveling direction of light entering the optical waveguide or first optical fiber is changed in a predetermined direction. Specifically, the traveling direction of the light incoming from one end of the optical waveguide or first optical fiber is changed so that light is emitted in a direction substantially parallel with the board surface from the other end of the optical waveguide or first optical fiber. Moreover, the traveling direction of incoming light substantially parallel with the board surface from the other end of the optical waveguide or first optical fiber is changed so that light is emitted toward the optical element from the one end of the optical waveguide or first optical fiber.

In the above second optical connector, an optical element is optically connected with a second optical fiber by the optical waveguide or first optical fiber that is provided in a substrate on which an optical element is mounted. Therefore, an optical component such as a lens or reflection mirror is unnecessary. Moreover, because the optical element is mounted on the board in which the optical waveguide or first optical fiber is built, it is possible to mount the optical element while confirming the position of light entrance portion of the optical waveguide or first optical fiber. Therefore, it is possible to easily and accurately assemble the optical connector.

On a substrate on which an optical element is mounted, it is possible to form a plurality of coaxial via-plugs that are electrically connected with an electrical element for driving the above optical element and that penetrate the face of the substrate on which the above optical element is mounted and the other face of the substrate. By forming the coaxial via-plug on the board on which the optical element is mounted, it is possible to reduce the number of electrical wiring substrates such as resin substrates respectively provided with a coaxial via-plug.

Because the above coaxial via-plug penetrates the board on which the optical element is mounted and is able to connect with an electrical socket provided on the circuit board, the board on which the optical element is mounted can be separated from the circuit board, and components when a problem occurs can be easily replaced. As a result, it is possible to reduce the cost of a board or apparatus on which an optical module is mounted.

The above and other objects, features and advantage of the present invention will become apparent from the following description with reference to the accompanying drawings which illustrate examples of the present invention.

DESCRIPTION OF THE PREFERRED EMBODIMENTS

This application is based upon and claims the benefit of priority from Japanese Patent Application No. 2006-098483 filed on Mar. 31, 2006, the content of which is incorporated be reference.

First Embodiment

Figure 2A:
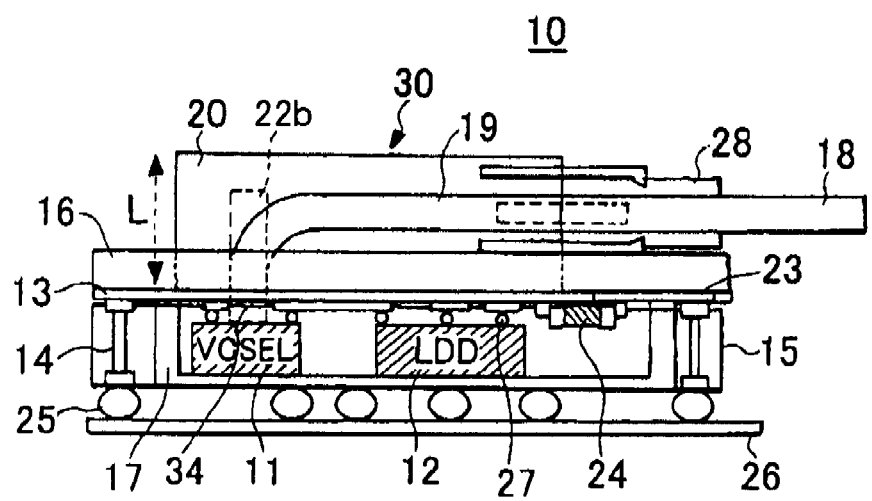
FIG. 2A is a side view of the optical module of the first embodiment and FIG. 2B is a top view of the first embodiment.
Figure 2B:
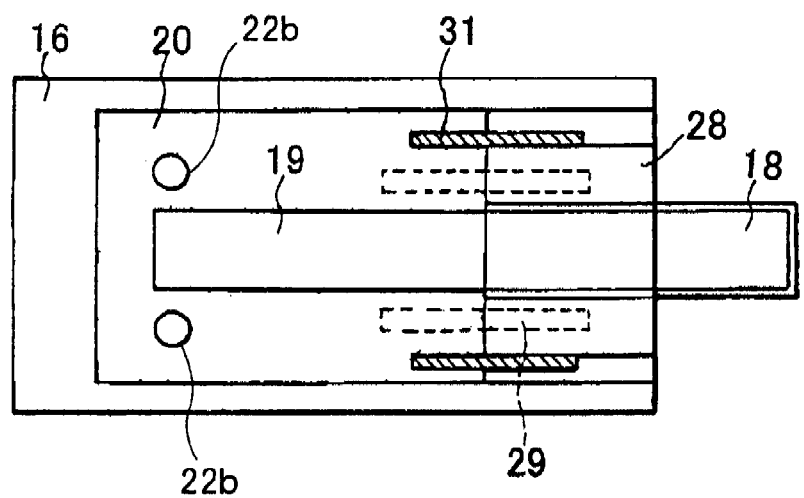
Figure 3:
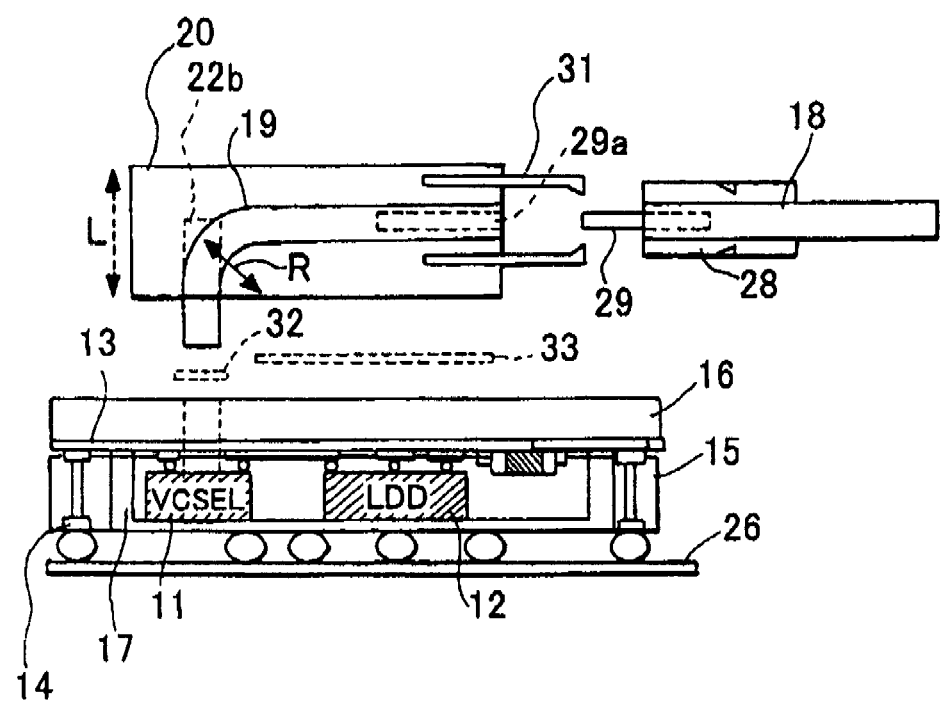
FIG. 3 is a decomposed view of the optical module of the first embodiment.
Figure 4:
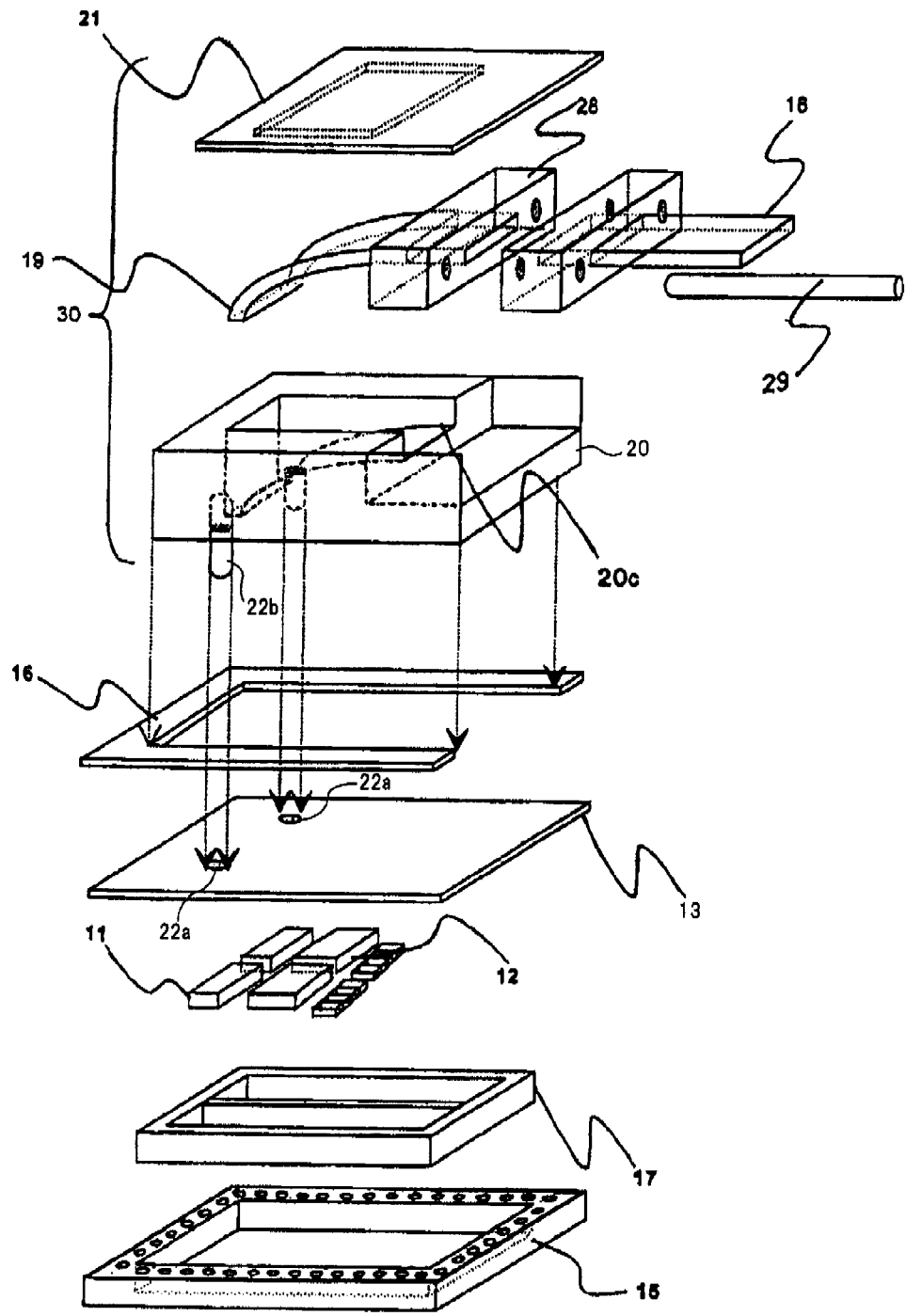
FIG. 4 is a decomposed perspective view of the optical module of the first embodiment.

FIG. 2A is a side view of optical module 10 of this embodiment and FIG. 2B is a top view. FIG. 3 is a decomposited side view of optical module 10 of this embodiment. FIG. 4 is a decomposited perspective view of optical module 10 of this embodiment.

As shown in FIGS. 2A and 2B, 3, and 4, optical module 10 has optical element 11, electrical element 12, transparent resin board 13, circuit board 26, interposer 15, transparent-resin-board holding table 16, and metallic shielding frame 17.

Optical element 11 of this embodiment is a light emitting element. More specifically, optical element 11 is an array-shaped surface-emitting laser. Electrical element 12 of this embodiment is a laser diode driver. Optical element 11 and electrical element 12 are flip-chip-mounted on transparent resin board 13. Interposer 15 is a resin board provided with a coaxial via-plug for introducing an electrical signal to circuit board 26 from transparent resin board 13. Transparent-resin-board holding table 16 helps to improve the accuracy for aligning optical connector 30 and helps to enhance strength and heat dissipation of optical module 10. Metallic shielding frame 17 serves to prevent electrical crosstalk, to strengthen reinforcement of optical module 10, and to dissipate heat.

Optical element 11 can be replaced with a light-receiving element. Both light-emitting and light-receiving elements may be mounted as optical element 11. As an example of a light-receiving element, an array-shaped photodiode is used. When the photodiode is mounted, a photodiode receiver is mounted as electrical element 12.

Optical module 10 is provided with optical connector 30 constituted of optical waveguide 19 for introducing an optical signal output from optical element (light-emitting element) 11 to optical fiber 18, optical waveguide support 20 for holding optical waveguide 19 and holding plate 21. When optical element 11 is a light-receiving element, optical waveguide 19 introduces an optical signal that is outputted from optical fiber 18 to optical element (light-receiving element) 11. Thickness L of optical connector 30 is preferably in the order of 5 to 15 mm. Thickness L of optical connector 30 of this embodiment is approximately 10 mm.

As shown in FIG. 4, support 20 has optical waveguide guide 20c. Optical waveguide guide 20c has an opening through which an end of optical waveguide 19 contacts with transparent resin board 13. Holding plate 21 serves as support of optical waveguide 19 and MT connector 28.

Positioning hole 22a is formed on transparent resin board 13 of optical module 10. Optical connector 30 has pin 22b which can be fitted to positioning hole 22a. Optical connector 30 is directly connected to transparent resin board 13, and an optical signal output from optical element (light-emitting element) 11 is introduced to optical fiber 18. When optical element 11 is a light-receiving element or the light-receiving element is included in optical element 11, an optical signal output from optical fiber 18 is introduced to the optical element. Transparent-resin-board holding plate 16 encloses three sides of optical connector 30 and positions optical connector 30 from the outside.

It is also possible to set positioning hole 22a to optical connector 30 and to set pin 22b to transparent resin board 13. Moreover, it is possible to set positioning hole 22a or pin 22b to transparent board holding plate 16.

Because optical waveguide 19 and transparent resin board 13 directly contact each other, an optical component such as a lens is not necessary.

Therefore, the number of components constituting an optical module and optical connector is reduced and it is possible to fabricate an optical module at a low cost.

Transparent resin board 13 has permeability to the wavelength of the light inputted to or outputted from optical element 11. Transparent resin board 13 includes electrical wiring 23 for transmitting an electrical signal to control a laser diode driver and photodiode receiver, and includes electrical element 24 such as a capacitor, dielectric layer, and polyimide layer (protective layer). It is unnecessary that the entire of transparent resin board 13 be transparent. It is sufficient that board 13 be optically transparent for an optical signal inputted to or outputted from the optical element. Therefore, it is sufficient that at least the region of transparent resin board 13 facing optical element 11 be transparent. The same is true for other embodiments.

The electrical signal is transmitted from electrical wiring 23 of transparent resin board 13 to circuit board 26 through coaxial via-plug 14 of interposer 15 and bump 25.

Because transparent resin board 13 is directly connected with optical waveguide 19, it is preferable that the thickness of board 13 be tens of microns. It is also preferable that the distance between transparent resin board 13 and optical element 11 that is flip-chip-mounted on board 13 be tens of microns.

It is possible to adjust the distance between transparent resin board 13 and optical element 11 by changing the diameter of metallic (Au) bump 27. When considering optical loss, it is preferable that the thickness of transparent resin board 13 be minimized.

It is preferable to form reflection preventive film 32 on a face of transparent resin board 13 to which optical waveguide 19 is directly connected, as shown in FIG. 3. Or, it is preferable to fill the gap between transparent resin board 13 and optical waveguide 19 with solvent (matching oil) 33 or adhesive 33 having substantially the same refractive index as transparent resin board 13 and optical waveguide 19.

Moreover, to restrain the light emission angle from board 13 by decreasing the gap (optical path length) between optical element 11 and transparent resin board 13, it is preferable to fill the gap between board 13 and optical element 11 with under-fill agent 34 (FIG. 2A) having a refractive index higher than that of air.

By using under-fill agent 34, which is transparent to the wavelength of light inputted/outputted to and from optical element 11 and has a refractive index substantially equal to that of transparent resin board 13, it is possible to restrain the reflection between transparent resin board 13 and optical element 11.

As shown in FIG. 3, support 20 can be connected with optical fiber 18. Support 20 has a positioning structure compatible with a standard connector mounted on optical fiber 18. Support 20 of this embodiment has positioning hole 29a into which pin 29 of MT (Mechanically Transferable) connector 28 can be inserted and has MT connector support portion 31. Pin 29 may also be provided to support 20 and positioning hole 29a may be provided to MT connector 28. In FIG. 4, MT connector support portion 31 is omitted. A connector is not restricted to the MT connector. Connectors other than the MT connector can also be used.

Support 20 directly contacts transparent resin board 13. It is preferable to fix support 20 and transparent resin board 13 by using the above adhesive 33 or the like.

As shown in FIGS. 3 and 4, optical waveguide guide 20c is provided to support 20 for supporting optical waveguide 19 in order to accurately attach optical waveguide 19. The optical waveguide 19 is bent along optical waveguide guide 20c.

By using optical waveguide 19 formed of a soft material such as polymer, bend loss is kept within 1 dB even if optical waveguide 19 is bent in the range of a curvature radius between 2 mm and 10 mm.

By ensuring that optical waveguide guide 20c and positioning hole 22a are accurate, optical connector 30 and optical element 11 can be accurately positioned and it is possible to easily optically connect optical waveguide 19 with optical element 11.

As described above, by providing optical element 11 and electrical element 12 to drive optical element 11 to one face of transparent resin board 13, and by positioning one face of bent optical waveguide (curved waveguide) 19 so as to contact the other face of transparent resin board 13, it is possible to omit a lens and reflection mirror.

For example, the thickness of transparent resin board 13 is set to 20 μm. Optical element 11 having a radiation angle of 30° is flip-chip-mounted on the component side of transparent resin board 13. The gap between optical element 11 and the component sides of transparent resin board 13 is set to 10 μm. Under the above conditions, the diameter of the light flux after passes through the transparent resin board 13 becomes approximately 20 μm. Therefore, by setting the diameter of optical waveguide 19 to 50 μm, it is possible to realize optical coupling of the light output from optical element 11 to optical waveguide 19 with sufficient tolerance. Therefore, a lens for optically coupling the light output from optical element 11 with optical waveguide 19 is unnecessary.

The reflection mirror is replaced by curved waveguide 19. Curved waveguide 19 can be easily formed by bending a rectilinear waveguide made of a soft material such as inexpensive polymer waveguide or film waveguide at a curvature radius of 2 to 10 mm. Moreover, it is possible to accommodate an optical module on which many optical elements are mounted by bending a rectilinear waveguide having an array structure similarly to the above described. Therefore, it is unnecessary to prepare a curved waveguide having a particular structure. It is possible to form a curved waveguide by using a commercial polymer waveguide, a fiber sheet, or a ribbon fiber.

To accurately fix optical waveguide 19 to support 20, it is preferable that a recess for alignment be formed on support 20, as shown in FIG. 4. It is preferable that the end of optical waveguide 19 that contacts transparent resin board 13 be mirror-polished or that a reflection preventive film be formed on the end.

Figure 1:
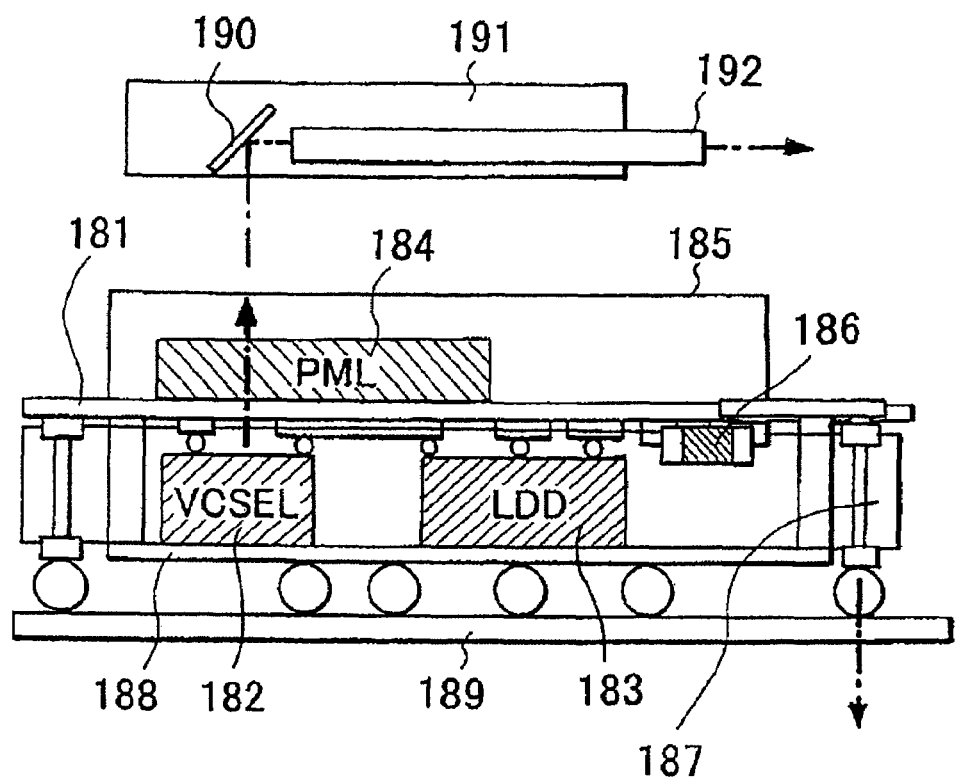
FIG. 1 is a side view of the optical module of a conventional example.

As described above, optical module 10 of this embodiment realizes high-efficiency optical coupling without using lens 184 or reflection mirror 190 shown in FIG. 1. Therefore, the number of components is reduced and the cost for mounting the lens and reflection mirror is reduced.

Because a standard connector such as the MT connector mounted on optical fiber 18 can be removably attached to optical connector 30, it is possible to easily change the destination of an optical signal.

Second Embodiment

In optical module 10 of the first embodiment, optical connector 30 in which optical waveguide 19 is built is set on transparent resin board 13. In the optical module of this embodiment, a recess is formed on a transparent resin board and an optical waveguide is provided in the recess.

Transparent resin board 13 of the first embodiment is directly connected to optical waveguide 19. Therefore, to reduce optical loss, it is preferable to set the thickness of transparent resin board 13 to tens of microns, Moreover, it is preferable that the distance between transparent resin board 13 and optical element 11 be tens of microns.

However, it is sufficient that only the region on which an optical element is mounted be thin. That is, it is sufficient that a region to or from which an optical signal is input or output have a thickness that is small. It is better that the thickness of the region of transparent resin board 13 other than the region to or from which an optical signal is input or output is large because this is advantageous in strength, radiation characteristic, and working accuracy. Moreover, by setting the thickness of transparent resin board 13 to approximately 10 mm, it is possible to omit support 20 and to use transparent resin board 13 for holding an optical waveguide 19. Therefore, the number of components is further reduced and cost can be reduced.

Figure 5A:
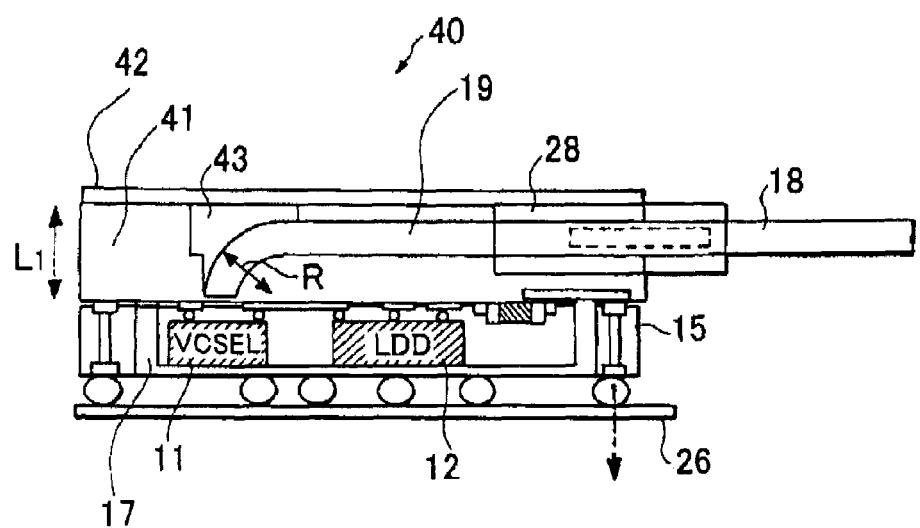
FIG. 5A is a side view of the optical module of second embodiment and FIG. 5B is a top view of the optical module of the second embodiment.
Figure 5B:
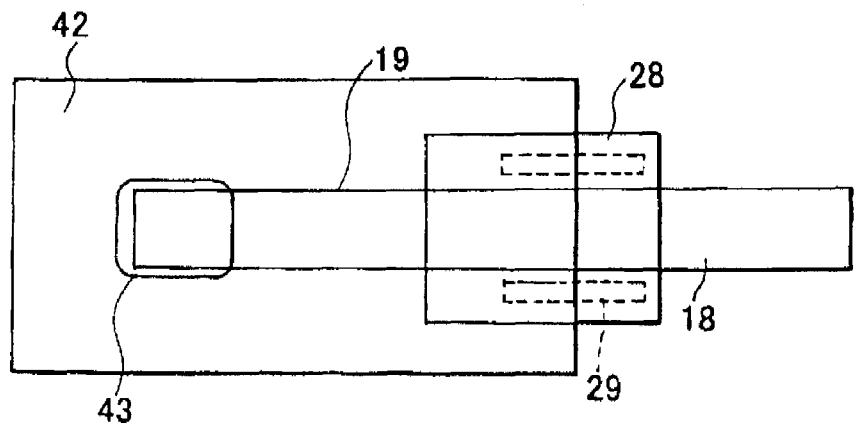
Figure 6:
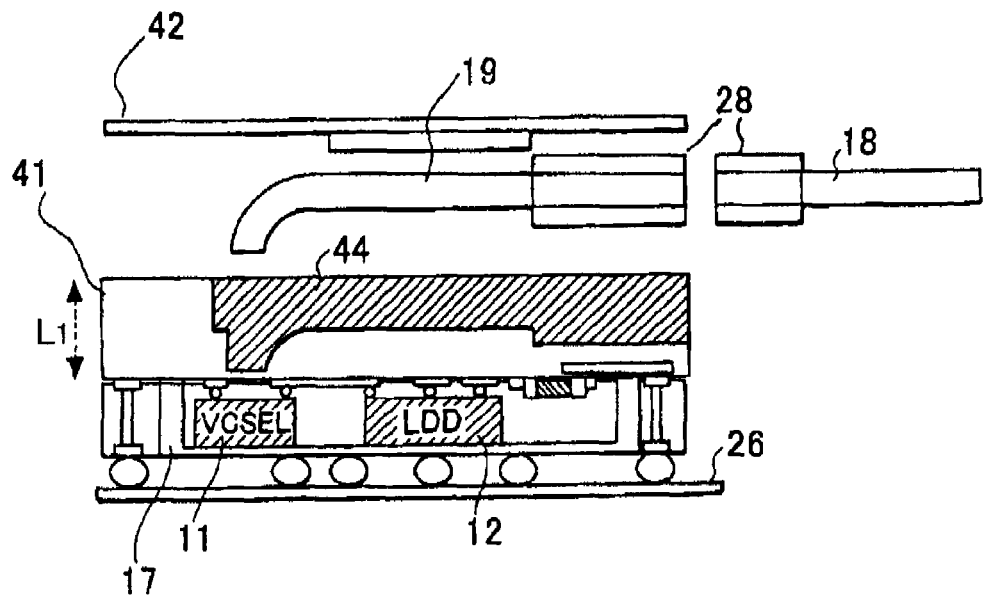
FIG. 6 is a decomposed side view of the optical module of the second embodiment.
Figure 7:
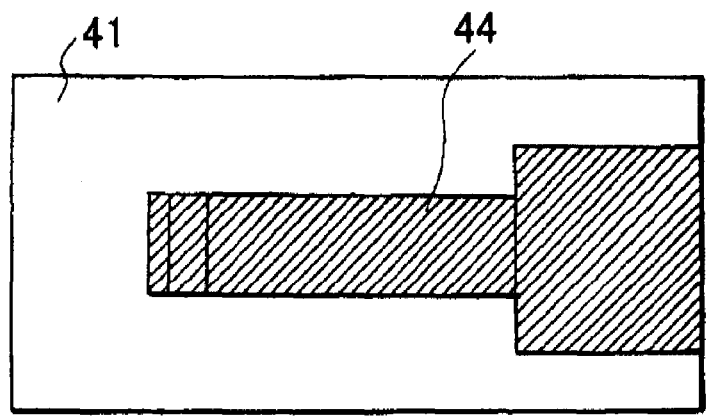
FIG. 7 is a top view of the transparent resin board shown in FIG. 6.
Figure 8:
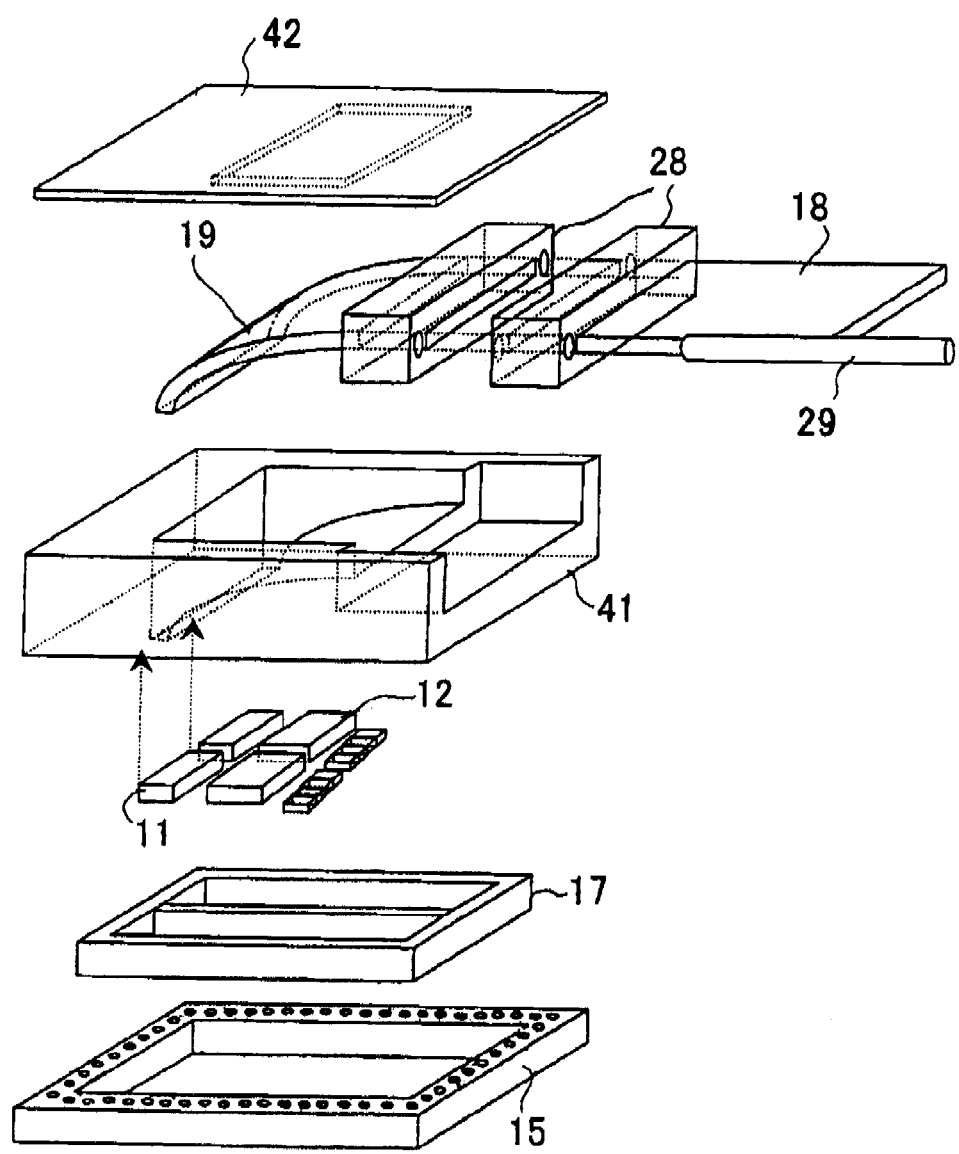
FIG. 8 is a decomposed side view of the optical module of the second embodiment.

FIG. 5A shows a side view of optical module 40 of this embodiment. FIG. 5B shows a top view of optical module 40. FIG. 6 is a decomposed side view of optical module 40. FIG. 7 is a top view of transparent resin board 41. FIG. 8 is a decomposed perspective view of optical module 40. The same material as the material shown in FIGS. 2 to 4 is provided with the same symbol.

An optical connector is constituted of transparent resin board 41, MT connector 28, optical waveguide 19, and transparent resin board holding plate 42. Optical module 40 is constituted of the optical connector on which optical element 11 and electrical element 12 are mounted and interposer 15 which is connected to the optical connector.

Optical module 40 of this embodiment has optical element 11, electrical element 12, transparent resin board 41, circuit board 26, interposer 15, transparent resin board holding plate 42, and metallic shielding frame 17.

Optical element 11 of this embodiment is a light-emitting element. More specifically, optical element 11 is an array-shaped face-emitting laser. Electrical element 12 of this embodiment is a laser diode driver. Optical element 11 and electrical element 12 are flip-chip-mounted on transparent resin board 41. Interposer 15 is a resin board provided with a coaxial via-plug for introducing an electrical signal from transparent resin board 41 to circuit board 26. Transparent resin board holding plate 42 serves to hold optical waveguide 19, to strengthen reinforcement of optical module 40, and to dissipate heat. Metallic shielding frame 17 serves to prevent electrical crosstalk, to strengthen reinforcement of optical module 40, and to dissipate heat.

Optical element 11 can be changed to a light-receiving element. Moreover, it is possible to mount both light-emitting element and light-receiving element as optical element 11. The light-receiving element is, for example, an array-shaped photodiode. When the photodiode is mounted, a photodiode receiver is mounted as electrical element 12.

As shown in FIGS. 6 and 7, thickness L1 of transparent resin board 41 is approximately 10 mm. Transparent resin board 41 has a structure for holding optical waveguide 19. The thickness of transparent resin board 41 in the portion between the ends of optical element 11 and optical waveguide 19 is reduced up to tens of microns in order to introduce an optical signal to optical waveguide 19 from optical element 11. Optical coupling between optical waveguide 19 and optical fiber 18 is performed by connecting MT connectors 28 by pin 29.

Optical waveguide 19 is fixed along recess 44 of transparent resin board 41. Specifically, the front end of optical waveguide 19 is fixed to recess 44 by a fixing agent (adhesive). Thereafter, optical waveguide 19 is bent along recess 44 to fix the bent optical waveguide 19 to recess 44.

MT connector 28 or the like is attached to an end to be connected with optical fiber 18 of optical waveguide 19.

As described above, by setting optical waveguide 19 in transparent resin board 41, it is not only a lens and reflection mirror but also support 20 of the first embodiment becomes unnecessary and the number of components is reduced. Therefore, it is possible to fabricate an optical module at lower cost.

Moreover, in this embodiment, it is possible to mount an optical element after mounting (bonding) optical waveguide 19 on transparent resin board 41. Therefore, because optical element 11 can be mounted after confirming the position of optical input portion of optical waveguide 19, it is possible to easily and securely improve optical coupling efficiency.

Third Embodiment

In the second embodiment, transparent resin board holding plate 42, interposer 15, and circuit board 26 face both sides of transparent resin board 41. The electrical connection of circuit board 26 is secured by a coaxial via-plug provided to interposer 15.

Figure 9:
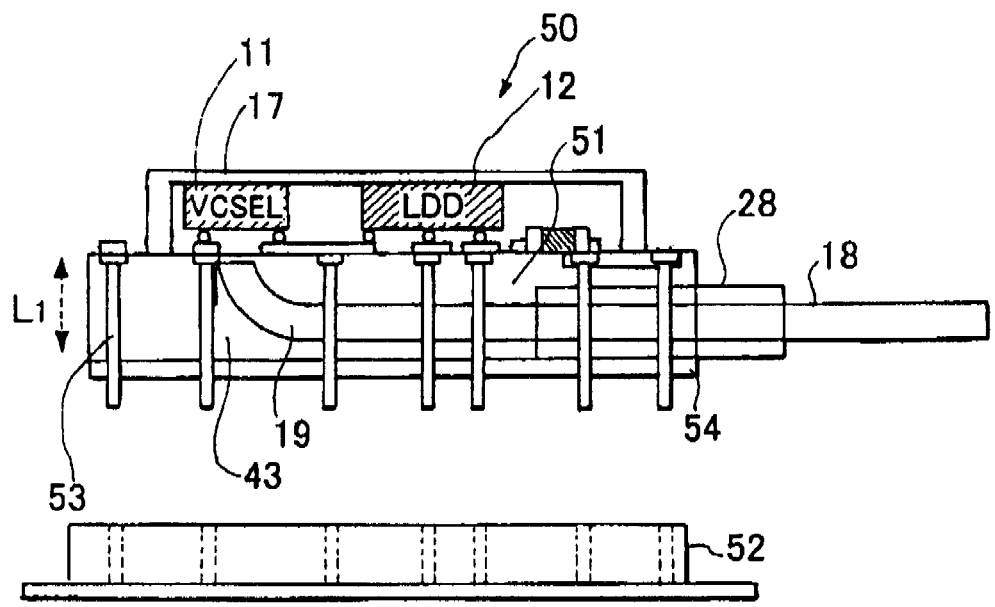
FIG. 9 is a decomposed side view of the optical module of the third embodiment.

FIG. 9 shows a side view of optical module 50 of this embodiment. As shown in FIG. 9, in optical module 50 of the embodiment, coaxial vie-plug 53 is provided to transparent resin board 51. Moreover, electrical socket 52 is provided on the same side as the side at which transparent resin board holding plate 54 is provided. Furthermore, the electrical connection of electrical socket 52 is secured by coaxial via-plug 53 provided to transparent resin board 51.

The same material as the material described above is provided with the same symbol in FIG. 9. The structure of transparent resin board 51 is the same as that of transparent resin board 41 shown in FIGS. 5 to 7 except for coaxial via-plug 53.

Optical element 11 of this embodiment is a light-emitting element. More specifically, element 11 is an array-shaped surface-emitting laser. Electrical element 12 of this embodiment is a laser diode driver. Optical element 11 and electrical element 12 are flip-chip-mounted on transparent resin board 51. Optical waveguide 19 is provided in transparent resin board 51. Moreover, coaxial via-plug 53 for transmitting an electrical signal to electrical socket 52 is formed on transparent resin board 51. It is possible to change electrical socket 52 to an adapter and a circuit board to be connected with coaxial via-plug 53.

The illustrated transparent resin board holding plate 54 serves to hold optical waveguide 19 and coaxial via-plug 54, to strengthen reinforcement of optical module 10 and to dissipate heat. Metallic shielding frame 17 serves to prevent electrical crosstalk, to strengthen reinforcement of optical module 50, and to dissipate heat.

Optical element 11 can be changed to a light-receiving element. Moreover, it is possible to mount both light-emitting element and light-receiving element as optical element 11. The light-receiving element is, for example, an array-shaped photodiode. When the photodiode is mounted, a photodiode receiver is mounted as electrical element 12.

Optical waveguide 19 in transparent resin board 51 is a curved waveguide. Optical waveguide 19 is directly mounted on transparent resin board 51 and is able to efficiently fetch an optical signal output from optical element 11 in the direction parallel with electrical socket 52.

By forming coaxial via-plug 53 on transparent resin board 51, it is possible to omit interposers 15 of the first and second embodiments. Therefore, it is possible to omit not only optical components such as a lens and reflection mirror but also an electrical wiring board such as an interposer.

Moreover, the stiffness of optical module 50 is reinforced because metallic shielding frame 17, thick transparent resin board 51, and transparent resin board holding plate 54 are present. Therefore, optical module 50 of this embodiment can sufficiently withstand stress produced when attaching and removing optical module 50 to or from electrical socket 52.

Moreover, by mounting electrical socket (adapter) 52 to a circuit board (not-illustrated), it is possible to change optical module 50 by only setting or removing coaxial via-plug 53.

Because coaxial via-plug 53 penetrates transparent resin board 51 and is able to connect with an electrical socket on the circuit board, transparent resin board 53 and a circuit board can be easily separated from each other. Therefore, components can be easily replaced when a problem occurs and it is possible to reduce the cost of a board or apparatus on which an optical module is mounted.

Optical module 50 of this embodiment having transparent resin board 51 on which optical waveguide 19 and coaxial via-plug 53 are mounted can be fabricated at a lower cost than that of optical modules 10 and 40 of the above embodiment. Therefore, an apparatus or circuit board on which optical module 50 of this embodiment is mounted is reduced in cost.

In optical module 50 of this embodiment, optical waveguide 19 is provided in transparent resin board 51 on which optical element 11 is mounted. However, as shown in the first embodiment, it is permissible to use a support separately from a transparent resin board and to provide a coaxial via-plug to an optical waveguide support.

While preferred embodiments of the present invention have been described using specific terms, such description is for illustrative purposes only, and it is to be understood that changes and variations may be made without departing from the spirit or scope of the following claims.

What is claimed:

1. An optical connector for connecting an optical element, disposed on a board, and an optical fiber, the connector comprising:
    a waveguide having a first end which optically connects to an upper surface of the optical element and a second end which optically connects to the optical fiber;
    a support which supports the waveguide; and
    a connector which mechanically connects the support and the optical fiber;
    wherein
        the upper surface of the optical element is substantially parallel to the board; and
        the waveguide guides light therein between the optical element and the optical fiber, such that light at the first end of the optical fiber travels therewithin substantially perpendicular to the upper surface of the optical element and the board, and light at the second end of the optical fiber travels therewithin substantially parallel to the upper surface of the optical element and the board.

2. The optical connector according to claim 1, further comprising a coaxial via-plug which electrically connects an electrical element disposed on the board to a circuit board through said support.

3. The optical connector according to claim 2, wherein the coaxial via-plug penetrates support and electrically connects with an electrical socket disposed on the circuit board.

4. The optical connector according to claim 1, further comprising a holding plate which protects the board, and the connector.

5. The optical connector according to claim 1, wherein the board comprises transparent resin.

6. An optical module comprising: the board on which the optical element is mounted and the optical connector of claim 1.

7. An optical connector for connecting an optical element, disposed on a board, and an optical fiber, the connector comprising:
    an optical waveguide having a first end which optically connects to an upper surface of the optical element, and a second end which optically connects with the optical fiber;
    a connector which mechanically connects the board and the optical fiber;
    wherein
        the upper surface of the optical element is substantially parallel to the board; and
        the waveguide guides light therein between the optical element and the optical fiber, such that light at the first end of the optical fiber travels therewithin substantially perpendicular to the upper surface of the optical element and the board, and light at the second end of the optical fiber travels therewithin substantially parallel to the upper surface of the optical element and the board.

8. An optical module comprising:
    the board on which the optical element is mounted;
    the optical connector of claim 7;
    a plurality of coaxial via-plugs that penetrate the board between first face on which the optical element is mounted and a second face; and
    an electrical element which drives the optical element and is electrically connected to the coaxial via-plugs.

9. The optical module according to claim 8, wherein at least one of the plurality of coaxial via-plugs electrically connects with an electrical socket provided to a circuit board.

10. The optical connector according to claim 7, further comprising a holding plate which protects the board, and the connector.

11. The optical connector according to claim 7, wherein the board comprises transparent resin.

12. An optical module comprising the optical connector of claim 7 and the optical element mounted on the board.

* * * * *